United States Patent
Rentz

(10) Patent No.: US 8,500,436 B2
(45) Date of Patent: Aug. 6, 2013

(54) BALL LOCK CLAMP

(75) Inventor: Matthew Rentz, Shelby Township, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 13/432,448

(22) Filed: Mar. 28, 2012

(65) Prior Publication Data

US 2012/0269921 A1 Oct. 25, 2012

Related U.S. Application Data

(60) Provisional application No. 61/477,847, filed on Apr. 21, 2011.

(51) Int. Cl.
*B29C 33/20* (2006.01)

(52) U.S. Cl.
USPC ............................... 425/451.9; 403/31

(58) Field of Classification Search
USPC .................. 425/451.9, 595; 403/31
See application file for complete search history.

(56) References Cited

U.S. PATENT DOCUMENTS

| | | | | |
|---|---|---|---|---|
| 3,085,462 A * | 4/1963 | Myers | ............................. | 411/348 |
| 3,986,805 A * | 10/1976 | Haines | ......................... | 425/451.9 |
| 4,315,727 A * | 2/1982 | Black | .......................... | 425/451.9 |
| 4,372,738 A * | 2/1983 | Black et al. | ................. | 425/451.9 |
| 4,671,764 A * | 6/1987 | Hehl | .............................. | 425/595 |
| 4,790,739 A * | 12/1988 | Manfredi | ....................... | 425/595 |
| 5,810,344 A | 9/1998 | Nishimoto | | |
| 6,024,354 A | 2/2000 | Yonezawa | | |
| 6,101,888 A | 8/2000 | Yonezawa | | |
| 6,379,072 B1 * | 4/2002 | Brown et al. | .................... | 403/31 |
| 6,527,266 B1 | 3/2003 | Yonezawa et al. | | |
| 6,604,738 B2 | 8/2003 | Haruna | | |
| 6,955,347 B2 | 10/2005 | Kawakami et al. | | |
| 6,997,448 B2 | 2/2006 | Roth et al. | | |
| 7,021,615 B2 | 4/2006 | Kuroda | | |
| 7,165,763 B2 | 1/2007 | Yonezawa et al. | | |
| 7,232,121 B2 | 6/2007 | Haruna | | |
| 7,258,539 B2 * | 8/2007 | Lowe et al. | ................ | 425/192 R |
| 7,382,145 B2 | 6/2008 | Thurmaier | | |
| 7,425,000 B2 | 9/2008 | Stark | | |
| 7,520,495 B2 | 4/2009 | Stark | | |
| 7,654,285 B2 | 2/2010 | Stark | | |
| 7,748,690 B2 | 7/2010 | Stark | | |

(Continued)

FOREIGN PATENT DOCUMENTS

GB 2 201 727 9/1988
JP 2003-200430 7/2003

*Primary Examiner* — James Mackey
(74) *Attorney, Agent, or Firm* — Harness, Dickey & Pierce, P.L.C.

(57) ABSTRACT

A ball lock clamp includes a cylinder housing. A first piston is movable in the cylinder housing in response to a first fluid pressure. A second piston is movable in the first piston. A rod extends from the first piston. A biasing member is positioned in the cylinder housing to provide a biasing force between the first piston and the housing. A plunger is at a terminal end of the rod. The plunger includes at least one ball moving radially in and out of the plunger. A receiver receives the plunger. The receiver retains the plunger in a locked position in the receiver. A mechanism releases the plunger from the receiver. The mechanism includes a member in the rod to move the at least one ball radially in and out of the rod.

15 Claims, 7 Drawing Sheets

U.S. PATENT DOCUMENTS

| | | |
|---|---|---|
| 7,819,392 B2 | 10/2010 | Kuroda et al. |
| 7,963,717 B2 * | 6/2011 | Seger .............................. 403/31 |
| 8,087,650 B2 | 1/2012 | Kuroda et al. |
| 2005/0271763 A1 | 12/2005 | Jachimski |
| 2007/0001360 A1 | 1/2007 | Haruna |
| 2011/0163489 A1 | 7/2011 | Munoz De Juan |

* cited by examiner

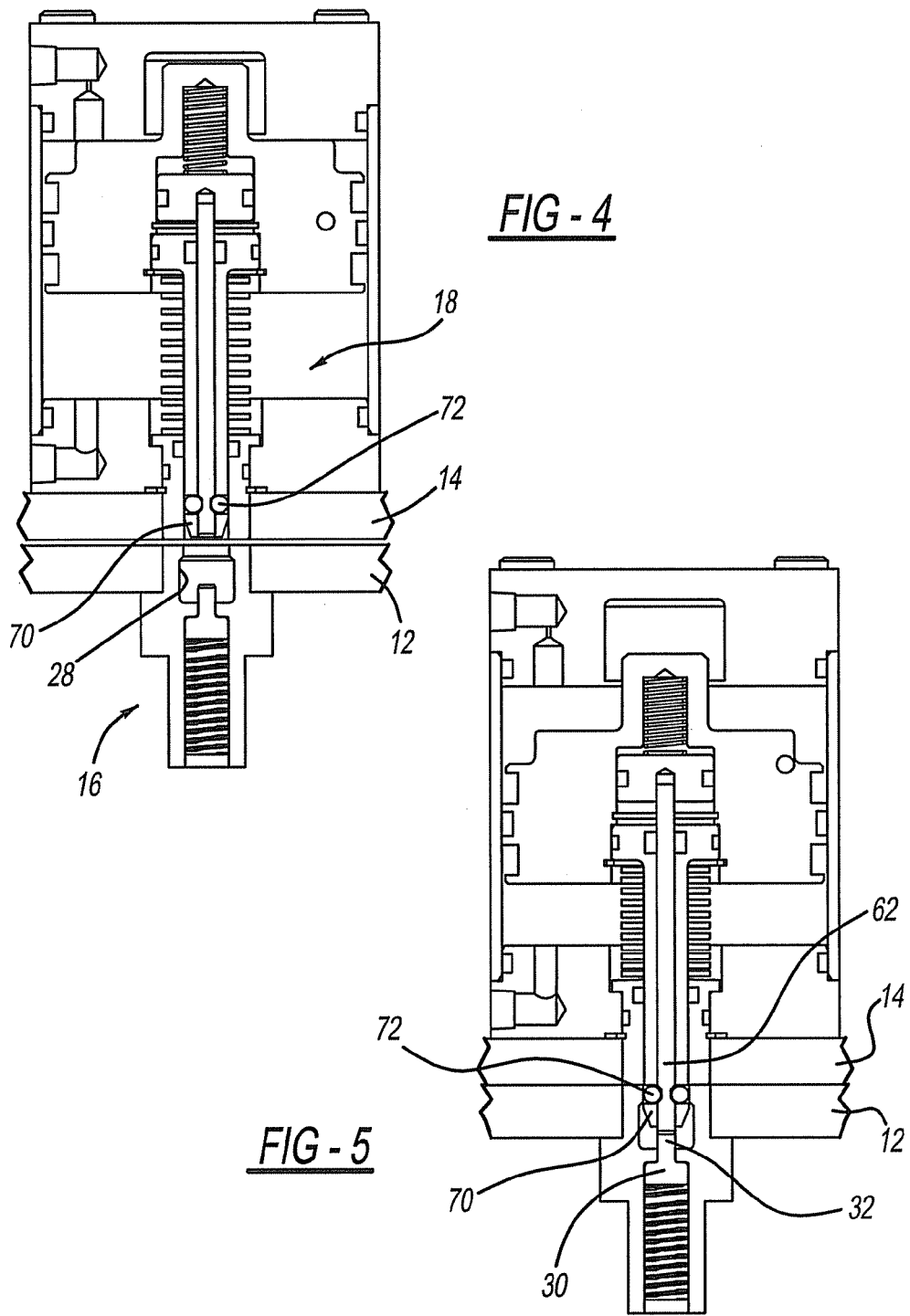

BALL LOCK CLAMP

CROSS-REFERENCE TO RELATED APPLICATIONS

This application claims the benefit of U.S. Provisional Application No. 61/477,847, filed on Apr. 21, 2011. The entire disclosure of the above application is incorporated herein by reference.

FIELD

The present disclosure relates to clamps and, more particularly, to clamps that hold together two molds that utilize a clamp with a ball lock.

BACKGROUND

In manufacturing of parts that require mold halves to be coupled with one another, clamping is of vital importance to hold the mold halves during the forming operation. Since an extraordinary amount of pressure is applied to the mold halves, a clamping device must be present that satisfactorily holds the molds together. Also, it is desirable to have clamping apparatus that is readily securable as well as readily releasable. Further, it is desirable to have a clamping apparatus that is computer controlled. Additionally, it is desirable to have a clamping apparatus that utilizes fluid pressure.

The present disclosure provides a clamping apparatus that securely holds two mold halves together. The clamping apparatus is capable of functioning in a vacuum at increased temperatures. The present device operates with a working pressure of 80 psi. Additionally, the clamping apparatus exerts and maintains a force of 500 to 750 lbs. with the fluid disconnected. Also, the clamping device provides a holding force of 1,000 lbs.

SUMMARY

According to an aspect of the disclosure, a ball lock clamp comprises a cylinder with a first movable piston in the cylinder that responds to a first fluid pressure. A second piston is movable in the first piston in response to a second fluid pressure. A rod extends from the first piston. A biasing member is positioned in the housing for providing a return force against the first piston to bias the first piston against the fluid pressure. A plunger is at a terminal end of the rod. The plunger includes at least one ball moving in and out of the plunger. A receiver to receive the plunger is positioned in a mold half. The receiver retains the plunger in the receiver. A mechanism to release the plunger from the receiver is coupled with the second piston. The mechanism includes a member inside the rod moving the at least one ball radially in and out of the plunger. The receiver is coupled with a first mold. The ball clamp is coupled with a second mold. The release mechanism further comprises the second piston coupled with the member inside the rod. Fluid pressure is applied to the second piston to move the member inside the rod between a first and second position. The receiver includes a contacting member contacting the rod member to position the at least one ball radially out of the plunger in a locking position. A second biasing member is positioned in the first piston to bias the second piston with respect to the first piston. The receiver includes a third biasing member to bias the contact member.

According to a second aspect of the disclosure, a mold clamp comprises a pair of mold halves. The mold halves are coupled with one another to mold a product. At least one clamp, for clamping mold halves together, is coupled with the mold halves. The at least one clamp comprises a cylinder with a first movable piston in the cylinder that responds to a first fluid pressure. A second piston is movable in the first piston in response to a second fluid pressure. A rod extends from the first piston. A biasing member is positioned in the housing for providing a return force against the first piston to bias the first piston against the fluid pressure. A plunger is at a terminal end of the rod. The plunger includes at least one ball moving in and out of the plunger. A receiver to receive the plunger is positioned in a mold half. The receiver retains the plunger in the receiver. A mechanism to release the plunger from the receiver is coupled with the second piston. The release mechanism includes a member inside the rod moving the at least one ball in and out of the plunger. The receiver is coupled with a first mold. The ball clamp is coupled with a second mold. The release mechanism further comprises the second piston coupled with the member inside the rod. Fluid pressure is applied to the second piston to move the member inside the rod between a first and second position. The receiver includes a contacting member contacting the rod member to position the at least one ball out of the plunger in a locking position. A second biasing member is positioned in the first piston to bias the second piston with respect to the first piston. The receiver includes a third biasing member to bias the contact member. Additionally, a plurality of clamps are positioned about the periphery of the mold halves to clamp the mold halves together. The receiver is integrally received into a bore in the mold half or the receiver is attached to the mold half. The first biasing member is positioned around the rod. The first piston further comprises a bore to receive the biasing member acting on the second piston.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 4-11 are cross-sectional views like FIG. 2 illustrating operation of the clamp to clamp the mold halves.

DETAILED DESCRIPTION

Figure 1:
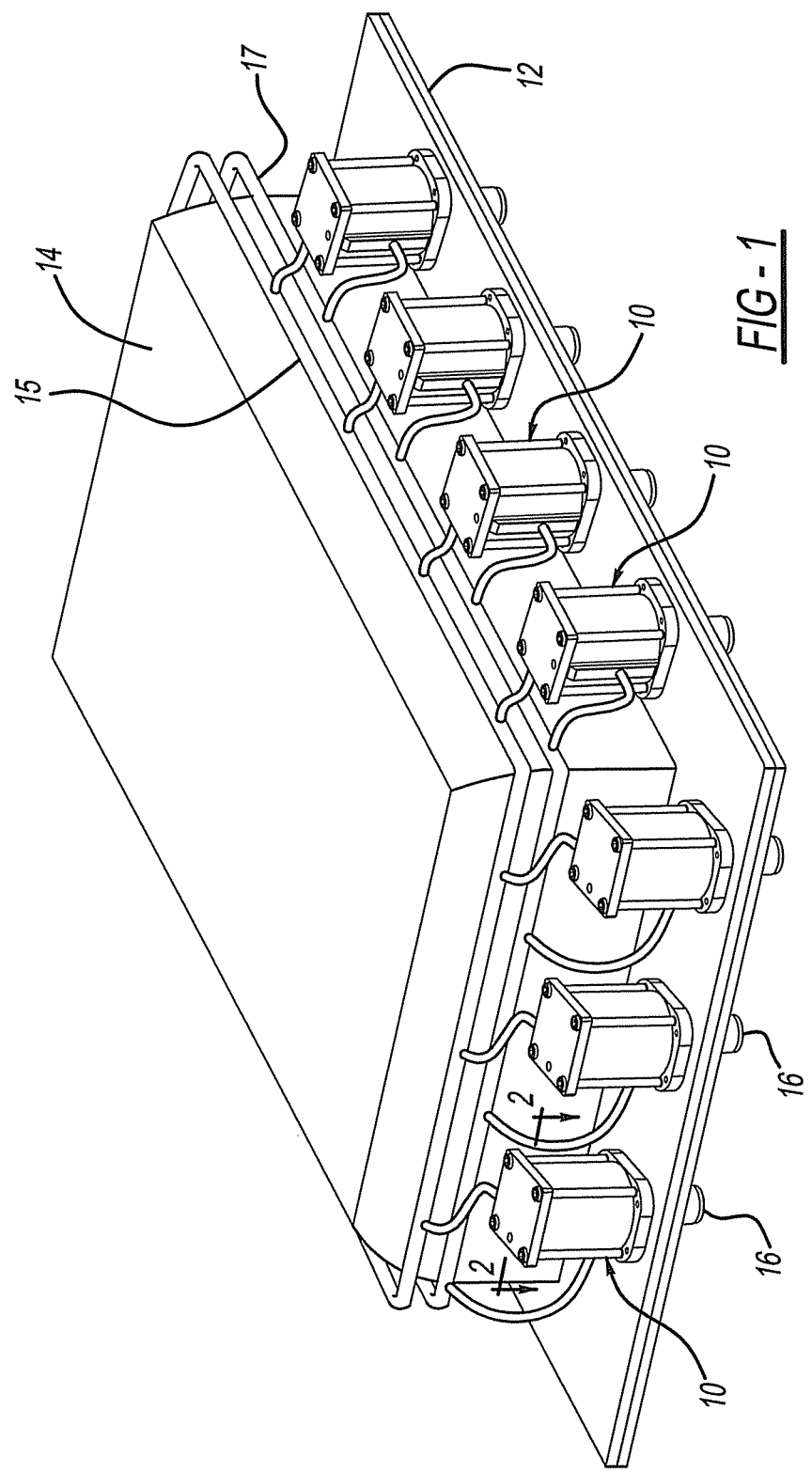
FIG. 1 is a perspective view of a pair of molds with a plurality of ball locking clamps in accordance with the disclosure.
Figure 2:
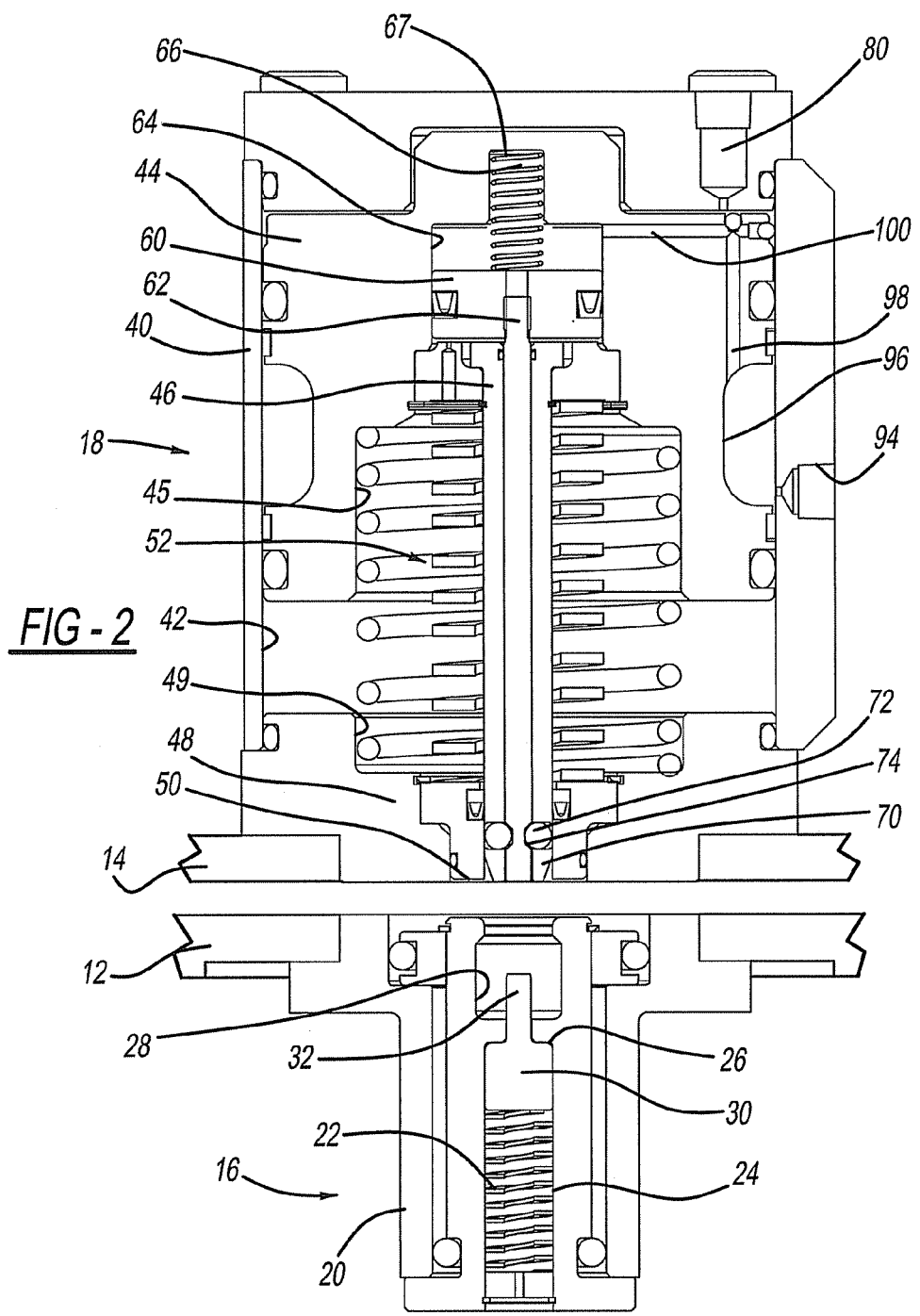
FIG. 2 is a cross-sectional view of the ball locking clamp of FIG. 1 along line 2-2 thereof.

Turning to the figures, a plurality of ball lock clamps is illustrated and each is designated with the reference numeral 10. The clamps 10 are associated about the periphery of the first and second mold halves 12, 14. The mold halves 12, 14 are schematically drawn. Manifolds 15, 17 supply fluid to the clamps 10. Each ball lock clamp 10 includes a receiver 16 in one mold half and a piston assembly 18 coupled with the other mold half.

The receivers 16 are coupled with the first mold half 12. Each receiver 16 includes a housing 20 that is secured with the periphery of mold half 12. Thus, only one receiver will be described; however, the description relates to all receivers 16. Alternatively, the receivers could be built into bores in the mold half 12. The housing 20 includes a bore 22 that receives a biasing member or spring 24. The bore 22 extends into a reduced bore portion 26 that extends out into an increased bore portion 28. A contact member 30 is positioned in the bore 22. The contact member 30 is biased by the spring 24. The contact member 30 includes a rod portion 32 that projects through the small bore portion 26. The rod portion 32 extends into the enlarged bore portion 28. The rod portion 32 actuates a piston assembly 18 as will be described herein.

The piston assemblies 18 are coupled with the second mold half 14 as seen in FIG. 1. Thus, only one piston assembly 18 is described; however, the description applies to all of the piston assemblies 18. Each piston assembly 18 includes a housing 40 that defines a cavity 42. A first piston 44 is positioned in the cavity 42. The first piston 44 moves within the cavity 42.

The piston 44 includes a rod member 46 that extends from the piston 44. The rod member 46 extends through a bushing 48 that includes a bore 50. The bushing 48 enables the rod member 46 to move in and out of the piston assembly 18. A biasing spring 52 is positioned around the rod member 46. The biasing spring 52 is in a biasing position between the piston 44 and the bushing 48. Both the piston 44 and bushing 48 includes bores 45, 49 that seat respective ends of the biasing spring 52.

A second piston 60 is positioned in the first piston 44. The second piston 60 includes an extending pin member 62. The second piston 60 moves in a cavity 64 in the first piston 44. Additionally, a biasing spring 66 is positioned within a bore 67 that is continuous with the cavity 64. The biasing spring 66 biases the piston 60 against a wall portion of piston 44.

The rod member 46 includes a plunger end 70. The plunger end 70 includes a plurality of balls 72. The balls 72 move radially inward and outward with respect to the circumferential surface of the rod 46. The pin member 62 includes a groove 74. The groove 74 receives the balls 72. Turning to FIGS. 4-11, operation of the clamp 10 will be discussed.

Figure 3:
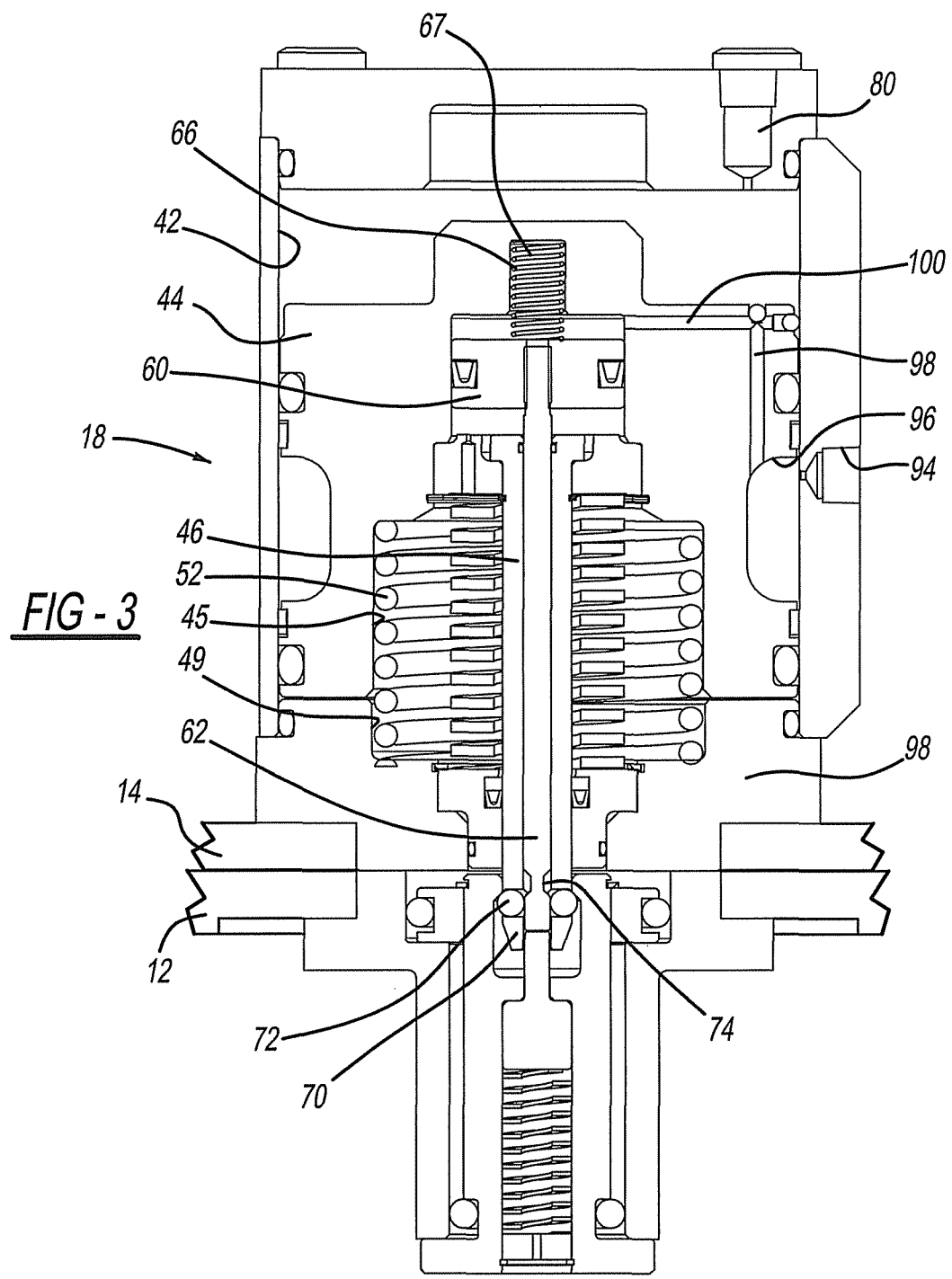
FIG. 3 is like a view of FIG. 2 with the piston and receiver connected.

The mold halves 12, 14 are positioned adjacent one another with the receiver 16 adjacent to and in alignment with the piston assembly 18 as seen in FIG. 3.

Figure 6:
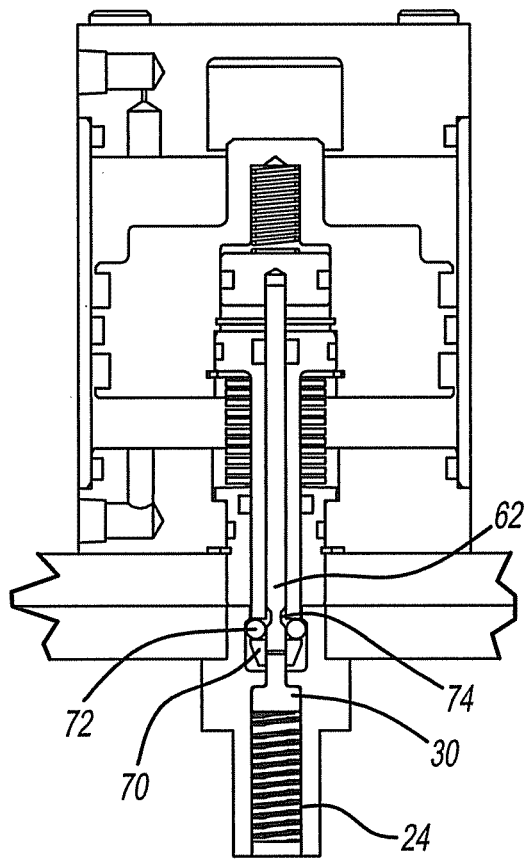
Figure 7:
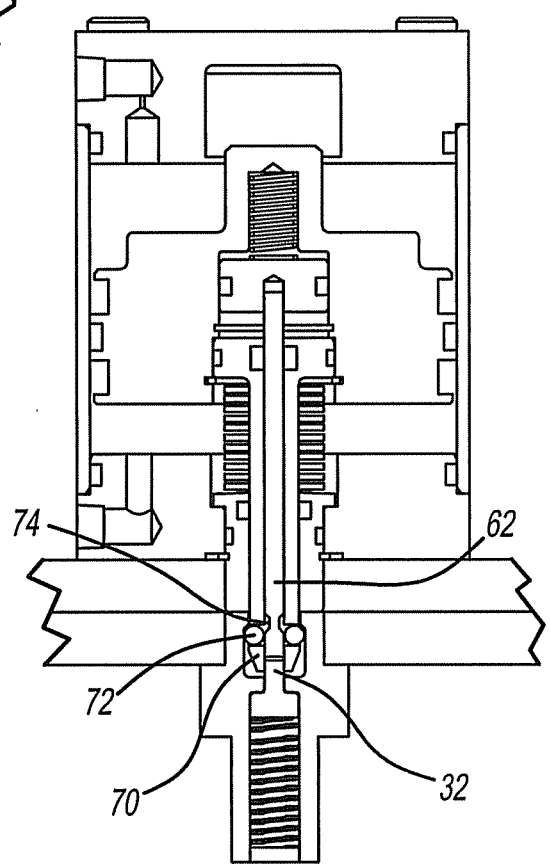
Figure 8:
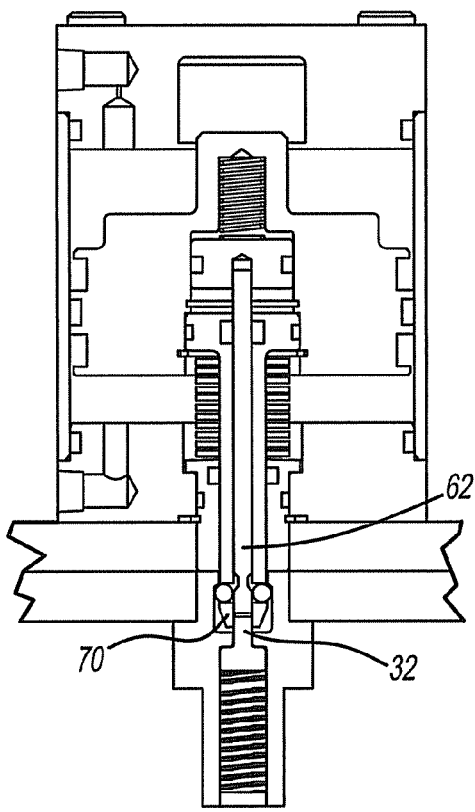

The piston assembly 18 is activated such that the fluid enters into the cavity 42 through port 80. As this occurs, the fluid pressure pushes the piston 44 against the biasing spring 52. As this continues, the plunger portion 70 of the rod member 46 enters into the enlarged bore 28 of the receiver 16, as seen in FIG. 5. The rod member 46 continues to move into the bore 28 until the rod portion 32 of the contact member 30 contacts the pin member 62. As this occurs, the pin member 62 and second piston 60 push against the biasing spring 66 as seen in FIG. 6. As this continues, the balls 72 exit the groove 74 so that the balls 72 are in contact with the top wall surface of the enlarged bore 28 as illustrated in FIG. 7. As illustrated in FIGS. 6-8, the piston assembly 18, via the balls 72, is connected with the receiver 16. At this time, power and/or fluid pressure may be terminated to the piston assembly 18. As this occurs, the spring 52 exerts a force on the piston 44 and bushing 48 which, in turn, holds the two mold halves 12, 14 in a locked position.

Figure 9:
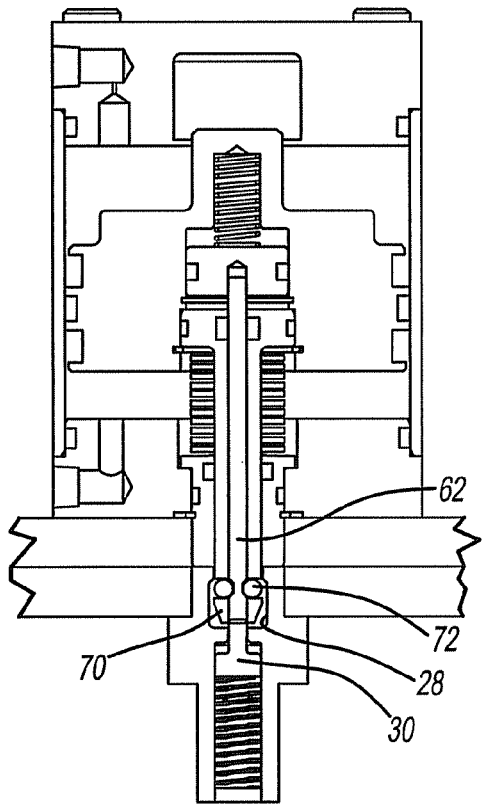
Figure 10:
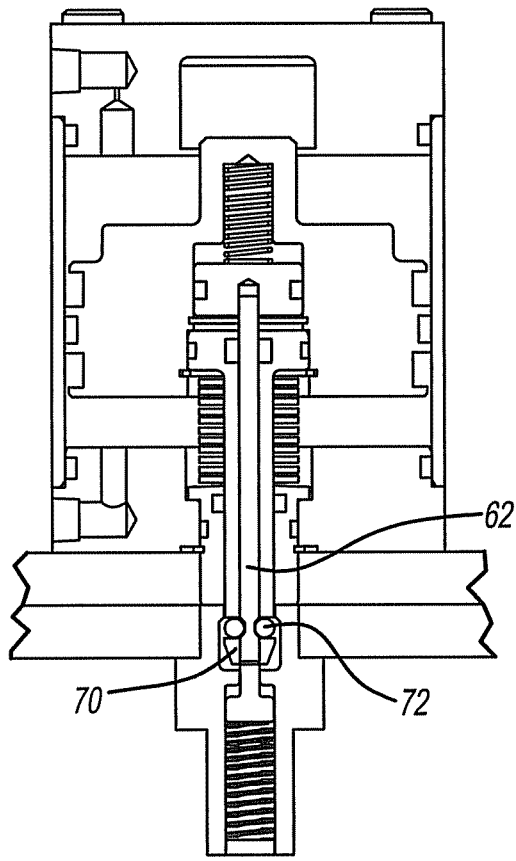
Figure 11:
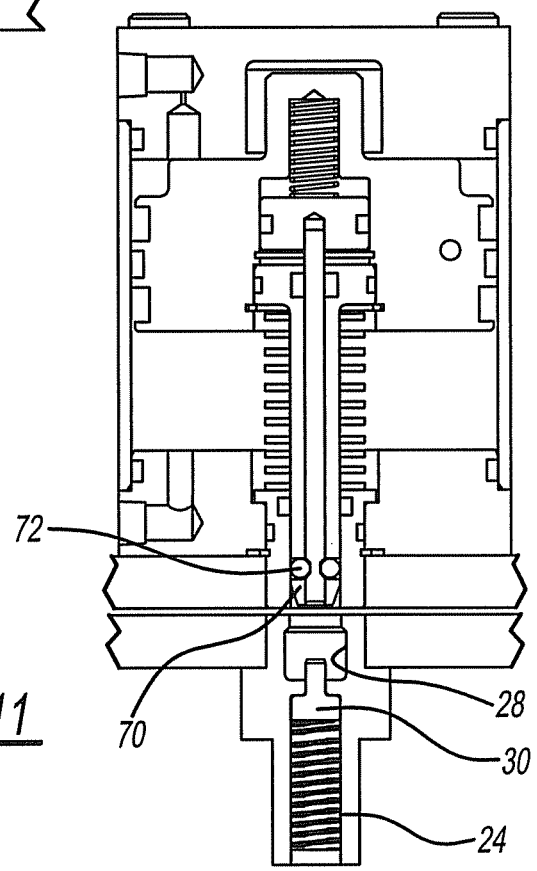

Once the mold halves 12, 14 are to be released from one another, the second piston 60 is activated by fluid entering into cavity 64. Fluid passes from manifold 17, via line 92, through port 94. The fluid then passes into passage 96 in piston 44. Passages 98, 100 direct the fluid from passage 96 to cavity 64. Thus, pressurized fluid enters into cavity 64. As this occurs, second piston 60 along with pin member 62 move away from biasing spring 66, to the left in the drawings. Thus, as this occurs, the balls 72 enter into the groove 74 as illustrated in FIG. 9. As this continues, the contact member 30 is biased against the biasing spring 24 exiting from the plunger head 70 as illustrated in FIG. 10. Next, the plunger head 70, with the balls 72 positioned radially inward below the circumferential surface of the rod 46, are withdrawn from the receiver 16 as illustrated in FIG. 11.

Thus, the ball lock clamps 10 enable power to be terminated from the clamp during the molding operation. The clamps 10 retain their holding force with the power OFF. Thus, less energy is utilized during the molding process.

The description of the disclosure is merely exemplary in nature and thus, variations that do not depart from the gist of the disclosure are intended to be within the scope of the disclosure. Such variations are not to be regarded as a departure from the spirit and scope of the disclosure.

What is claimed is:

1. A ball lock clamp comprising:
   a cylinder housing;
   a first piston movable in said cylinder housing in response to a first fluid pressure;
   a second piston movable in the first piston;
   a rod extending from the first piston;
   a biasing member positioned in the cylinder housing for providing a force against the first piston and housing to bias the first piston against the fluid pressure;
   a plunger at a terminal end of the rod, the plunger including at least one ball moving in and out of the plunger;
   a receiver for receiving the plunger, the receiver retaining or locking the plunger in the receiver; and
   a mechanism for releasing the plunger from the receiver including a member in the rod, coupled with the second piston, for moving the at least one ball radially in and out of the rod for locking and releasing the at least one ball with the receiver and a contact member in the receiver for contacting the member in the rod.

2. The ball lock clamp of claim 1, wherein the receiver is coupled with a first mold.

3. The ball lock clamp of claim 2, wherein the ball lock clamp housing is coupled with a second mold.

4. The ball lock clamp of claim 1, wherein fluid pressure is applied onto the second piston to move the member.

5. The ball lock clamp of claim 1, further comprising a second biasing member positioned in a cavity in the first piston biasing the second piston with the first piston.

6. The ball lock clamp of claim 4, wherein the receiver includes a biasing member biasing the contact member.

7. A mold clamp comprising:
   a pair of mold halves;
   the mold halves coupling with one another for molding a product;
   at least one clamp for clamping the mold halves together, the at least one clamp comprising:
   a cylinder housing;
   a first piston movable in said cylinder housing in response to a first fluid pressure;
   a second piston movable in the first piston;
   a rod extending from the first piston;
   a biasing member positioned in the cylinder housing for providing a force against the first piston and housing to bias the first piston against the fluid pressure;
   a plunger at a terminal end of the rod, the plunger including at least one ball moving in and out of the plunger;
   a receiver for receiving the plunger, the receiver retaining or locking the plunger in the receiver; and a mechanism for releasing the plunger from the receiver including a member in the rod, coupled with the second piston, for moving the at least one ball radially in and out of the rod for locking and releasing the at least one ball with the receiver and a contact member in the receiver for contacting the member in the rod.

8. The mold clamp of claim 7, wherein fluid pressure is applied onto the second piston to move the member.

9. The mold clamp of claim 7, further comprising a second biasing member positioned in the first piston biasing the second piston with the first piston.

10. The mold clamp of claim 7, wherein the receiver includes a biasing member biasing the contact member.

11. The mold clamp according to claim 7, further comprising a plurality of clamps positioned about the periphery of the mold halves for clamping the mold halves together.

12. The mold clamp according to claim 7, wherein the receiver is integrally received into one of the mold halves.

13. The mold clamp according to claim 7, wherein the receiver is attached to one of the mold halves.

14. The mold clamp according to claim 7, wherein the biasing member is positioned around the rod.

15. The mold clamp according to claim 7, wherein the first piston further comprises a bore for receiving a second biasing member acting on the second piston.

\* \* \* \* \*